(12) United States Patent
Yamagata et al.

(10) Patent No.: US 10,745,958 B2
(45) Date of Patent: Aug. 18, 2020

(54) DOOR OPENING AND CLOSING APPARATUS FOR VEHICLE

(71) Applicant: U-SHIN LTD., Tokyo (JP)

(72) Inventors: Mikio Yamagata, Hiroshima (JP); Hideaki Nagata, Hiroshima (JP)

(73) Assignee: U-SHIN LTD., Tokyo (JP)

(*) Notice: Subject to any disclaimer, the term of this patent is extended or adjusted under 35 U.S.C. 154(b) by 207 days.

(21) Appl. No.: 15/352,808

(22) Filed: Nov. 16, 2016

(65) Prior Publication Data

US 2017/0145727 A1 May 25, 2017

(30) Foreign Application Priority Data

Nov. 24, 2015 (JP) ................................. 2015-228823
Nov. 7, 2016 (JP) ................................. 2016-216860

(51) Int. Cl.
*E05F 15/603* (2015.01)
*E05F 15/622* (2015.01)
(Continued)

(52) U.S. Cl.
CPC ............ *E05F 15/603* (2015.01); *E05F 15/60* (2015.01); *E05F 15/611* (2015.01);
(Continued)

(58) Field of Classification Search
CPC ......... E05F 15/00; E05F 15/06; E05F 15/603; E05F 15/611; E05F 15/616; E05F 15/622; F16H 25/20; F16H 25/24; F16H 25/2418; F16H 2025/2071; F16H 2025/2075; F16H 2025/2087; F16H 2025/204
(Continued)

(56) References Cited

U.S. PATENT DOCUMENTS 2,387,800 A * 10/1945 Leland ..................... B64D 1/04
244/102 R
4,392,390 A * 7/1983 Johnson ............. F16H 25/2204
464/173
(Continued)

FOREIGN PATENT DOCUMENTS

DE 102013214733 A1 * 1/2015 ............. F16C 11/02
JP 2011-106227 6/2011
(Continued)

*Primary Examiner* — Joseph Brown
(74) *Attorney, Agent, or Firm* — Wenderoth, Lind & Ponack, L.L.P.

(57) ABSTRACT

A door opening and closing apparatus for a vehicle includes a support member interposed between a body and a door of the vehicle and expandable and shrinkable so as to enable holding of the door at an open position. The support member includes a first housing unit having an electric motor driving mechanism and a second housing unit integrally joined to the first housing unit. The second housing unit includes an outer cylinder, an inner cylinder disposed concentrically in the outer cylinder and engaged with the outer cylinder by fitting engagement in a movable manner relative to the outer cylinder, a spindle connected to the electric motor driving mechanism, and a spindle driving mechanism for moving the inner cylinder relative to the outer cylinder in an axial direction due to rotation of the spindle.

8 Claims, 8 Drawing Sheets

(51) Int. Cl.
  *F16H 25/20* (2006.01)
  *F16H 25/24* (2006.01)
  *E05F 15/616* (2015.01)
  *E05F 15/611* (2015.01)
  *E05F 15/60* (2015.01)

(52) U.S. Cl.
  CPC .......... *E05F 15/616* (2015.01); *E05F 15/622* (2015.01); *F16H 25/20* (2013.01); *F16H 25/24* (2013.01); *F16H 25/2418* (2013.01); *F16H 2025/204* (2013.01); *F16H 2025/2031* (2013.01); *F16H 2025/2071* (2013.01); *F16H 2025/2075* (2013.01); *F16H 2025/2087* (2013.01)

(58) Field of Classification Search
  USPC ................................................ 74/89.23, 89.4
  See application file for complete search history.

(56) References Cited

U.S. PATENT DOCUMENTS

| | | | | |
|---|---|---|---|---|
| 4,580,365 A | * | 4/1986 | Sieg | E05F 3/102 49/336 |
| 2010/0186528 A1 | * | 7/2010 | Hillen | F16D 7/044 74/89.23 |
| 2011/0290050 A1 | * | 12/2011 | Kummer | E05F 15/622 74/89.37 |
| 2014/0000394 A1 | * | 1/2014 | Anheier | F16H 25/20 74/89.29 |
| 2015/0040702 A1 | * | 2/2015 | Bochen | F16F 9/54 74/89.23 |
| 2016/0195115 A1 | * | 7/2016 | Fenn | B64C 25/30 92/82 |
| 2017/0211671 A1 | * | 7/2017 | Nakayama | F16H 25/20 |

FOREIGN PATENT DOCUMENTS

| | | | | |
|---|---|---|---|---|
| JP | 2014-101637 | | 6/2014 | |
| WO | WO-2015174474 A1 | * | 11/2015 | ............... B60J 5/10 |

* cited by examiner

DOOR OPENING AND CLOSING APPARATUS FOR VEHICLE

CROSS-REFERENCE TO RELATED APPLICATIONS

This application claims priorities of Japanese Patent Application Nos.: 2015-228823 filed on Nov. 24, 2015 and 2016-216860 filed on Nov. 7, 2016, the contents of which are incorporated herein by reference.

BACKGROUND OF THE INVENTION

Technical Field

The present invention relates to a door opening and closing apparatus for a vehicle.

Related Art

A known door opening and closing apparatus for a vehicle includes a support member interposed between a back door which opens or closes a rear opening portion of the vehicle and a body of the vehicle, and can hold the back door at an open position by the support member (see JP 2014-101637 A, for example). The support member includes an inner cylinder and an outer cylinder which are disposed concentrically and are slidably engaged with each other by fitting engagement. In the inside of the inner cylinder, elements such as an electric motor which generates a drive force, a speed reduction gear mechanism which decelerates the rotation of the electric motor are housed. In the inside of the outer cylinder, elements such as a spindle, a spindle nut, a guide tube, a coil spring, a push rod are housed. The spindle is rotatably driven by the electric motor. The spindle nut is threadedly engaged with the spindle. Due to the rotation of the spindle, the inner cylinder is moved in an axial direction together with the spindle nut and the push rod. The coil spring biases the push rod and the outer cylinder in an axial direction. The guide tube houses the coil spring therein and slidably guides the push rod.

In the door opening and closing apparatus for a vehicle which includes such a support member, in a manipulation of opening the back door in a closed state, the electric motor is driven in response to such an open manipulation. The rotation of the electric motor is transmitted to the spindle while the rotation of the electric motor is decelerated by the speed reduction gear mechanism, and the spindle is rotatably driven at a decelerated speed. When the spindle is rotated, the spindle nut is moved (pushed out) in an axial direction together with the push rod and the inner cylinder. As a result, the inner cylinder is moved relative to the outer cylinder so that the support member is extended whereby the back door is moved toward an open position. At this stage of the operation, the back door can be stopped at any desired position due to a load balance among a biasing force of the coil spring, a biasing force of a gas spring, slide resistances of the speed reduction gear mechanism and the electric motor and the like. Accordingly, the back door is held at the open position. When a manipulation of closing the back door at the open position is performed, the electric motor is rotated reversely in response to such a closing manipulation and the spindle is also rotated reversely and hence, the spindle nut is moved in a reverse direction together with the guide tube and the inner cylinder. As a result, the inner cylinder is moved (pulled) relative to the outer cylinder against a biasing force of the coil spring whereby the support member is shrunken and the door is driven to the closed position.

Conventionally, with respect to this type of support member, the electric motor which is required to possess a watertight structure for preventing leakage of electricity and the spindle, the coil spring and the like which are not required to possess high watertight property are incorporated together in the support member. When the support member adopts such a structure, it is necessary to assemble all parts through consistent manufacturing steps. Accordingly, conventionally, a manufacturing step control of this type of support member is not easy so that productivity of the support member is low.

Further, an opening/closing angle, a mounting point and the like differ for respective vehicle types and hence, when it is necessary to provide support members having different lengths for the respective vehicle types, it is necessary to change the structure of the whole support member. Such a change of the structure pushes up a cost of the support member.

SUMMARY

The present invention has been made in view of the above-mentioned drawbacks, and it is an object of the present invention to increase productivity of a support member of a door opening and closing apparatus for a vehicle. It is another object of the present invention to provide a door opening and closing apparatus for a vehicle which can make a support member flexibly conform to each vehicle type without changing the whole support member.

According to an aspect of the present invention, there is provided a door opening and closing apparatus for a vehicle which includes a support member interposed between a body and a door of the vehicle and expandable and shrinkable so as to enable holding of the door at an open position, wherein the support member includes a first housing unit having an electric motor driving mechanism and a second housing unit integrally joined to the first housing unit, the second housing unit including an outer cylinder, an inner cylinder disposed concentrically in the outer cylinder and engaged with the outer cylinder by fitting engagement in a movable manner relative to the outer cylinder, a spindle connected to the electric motor driving mechanism, and a spindle driving mechanism for moving the inner cylinder relative to the outer cylinder in an axial direction due to rotation of the spindle.

The first housing unit may include a first connection portion capable of connecting one end of the spindle and the electric motor driving mechanism to each other, and a second connection portion capable of connecting the first connection portion may be provided to one end of the spindle of the second housing unit.

Either one of the first connection portion and the second connection portion may have a male threaded portion, and the other may have a female threaded portion threadedly engaged with the male threaded portion.

The door opening and closing apparatus for a vehicle may further include a watertight member interposed at a joint portion between the first housing unit and the second housing unit.

The electric motor driving mechanism includes an electric motor and a speed reduction gear mechanism which decelerates a rotation of the electric motor, the first housing unit includes a housing which houses the electric motor and the speed reduction gear mechanism, the second housing unit includes: a push rod fixed to a spindle nut threadedly engaged with the spindle; a guide tube which houses the push rod and the spindle nut and guides the push rod such that the push rod is movable in an axial direction with the spindle nut; a coil spring arranged concentrically on an outer periphery of the guide tube in a shrunken state; the inner cylinder connected to the push rod in an axial direction, disposed concentrically on an outer periphery of the guide tube, and having an inner peripheral end surface thereof biased in an axial direction by the coil spring; and the outer cylinder housing the inner cylinder therein such that the inner cylinder is advanceable and retractable.

The second housing unit may include a guide housing tube which is an integral body formed of the outer cylinder and the guide tube.

A stepped projecting portion having a male threaded portion may be formed on a proximal end of the guide housing tube, and the stepped projecting portion may have a bearing housing portion in which a bearing for supporting the spindle is housed. In this case, the housing of the first housing unit may have a bearing holding portion which is engaged with the bearing housed in the bearing housing portion in an axial direction.

According to the present invention, the electric motor driving mechanism (the electric motor and the speed reduction gear mechanism) which is required to possess high watertight property is provided to the first housing unit. On the other hand, the spindle, the coil spring and the spindle driving mechanism (the spindle nut, the push rod, the guide tube) and the like which are not required to possess high watertight property are provided to the second housing unit. The support member is formed by integrally joining the first housing unit and the second housing unit having such configurations respectively. Accordingly, the electric motor driving mechanism which requires an electrical check and the spindle and the spindle driving mechanism which require a mechanical check respectively can be manufactured separately and hence, productivity and quality of the support member can be enhanced.

Further, the first housing unit which includes the electric motor driving mechanism can be used in common and the second housing unit which includes the spindle and the spindle driving mechanism can be set for respective vehicle types and hence, it is possible to provide the support member which flexibly conforms to different vehicle types without changing the whole configuration of the support member.

BRIEF DESCRIPTION OF THE DRAWINGS

The foregoing and the other features of the present invention will become apparent from the following description and drawings of an illustrative embodiment of the invention in which:

FIG. 4 is a cross-sectional view of a support member provided to a door opening and closing apparatus for a vehicle according to a second embodiment of the present invention, wherein FIG. 4 is substantially equal to FIG. 2;

FIG. 5 is an exploded cross-sectional view of the support member provided to the door opening and closing apparatus for a vehicle according to the second embodiment of the present invention, wherein FIG. 5 is substantially equal to FIG. 3;

DETAILED DESCRIPTION OF EMBODIMENTS

Embodiments of the present invention are described hereinafter with reference to attached drawings.

First Embodiment

Figure 1:
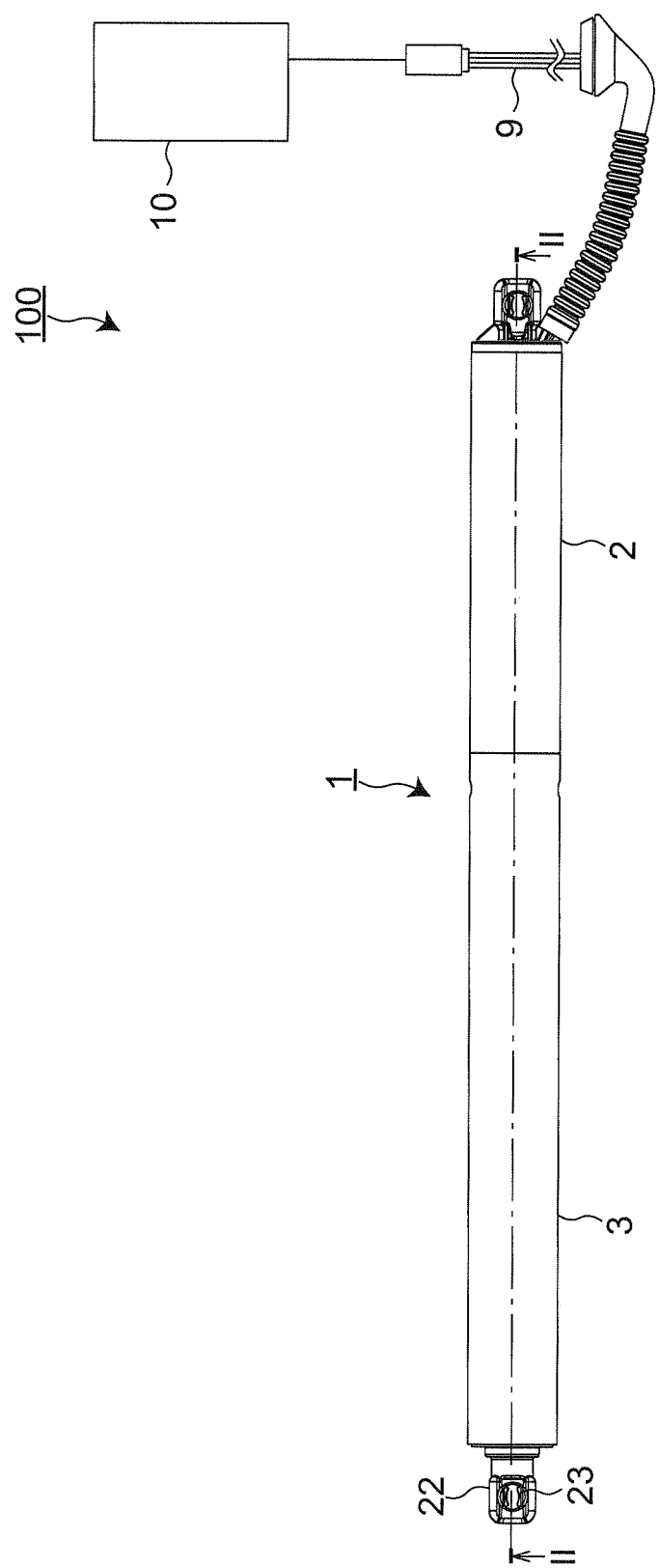
FIG. 1 is a front view of a support member provided to a door opening and closing apparatus for a vehicle according to a first embodiment of the present invention.
Figure 2:
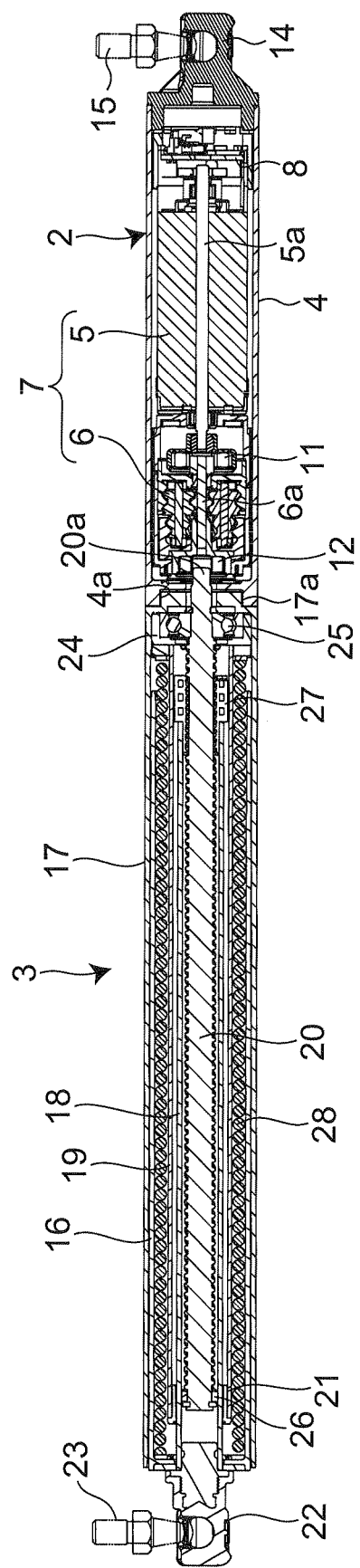
FIG. 2 is a cross-sectional view taken along a line II-II in FIG. 1.
Figure 3:
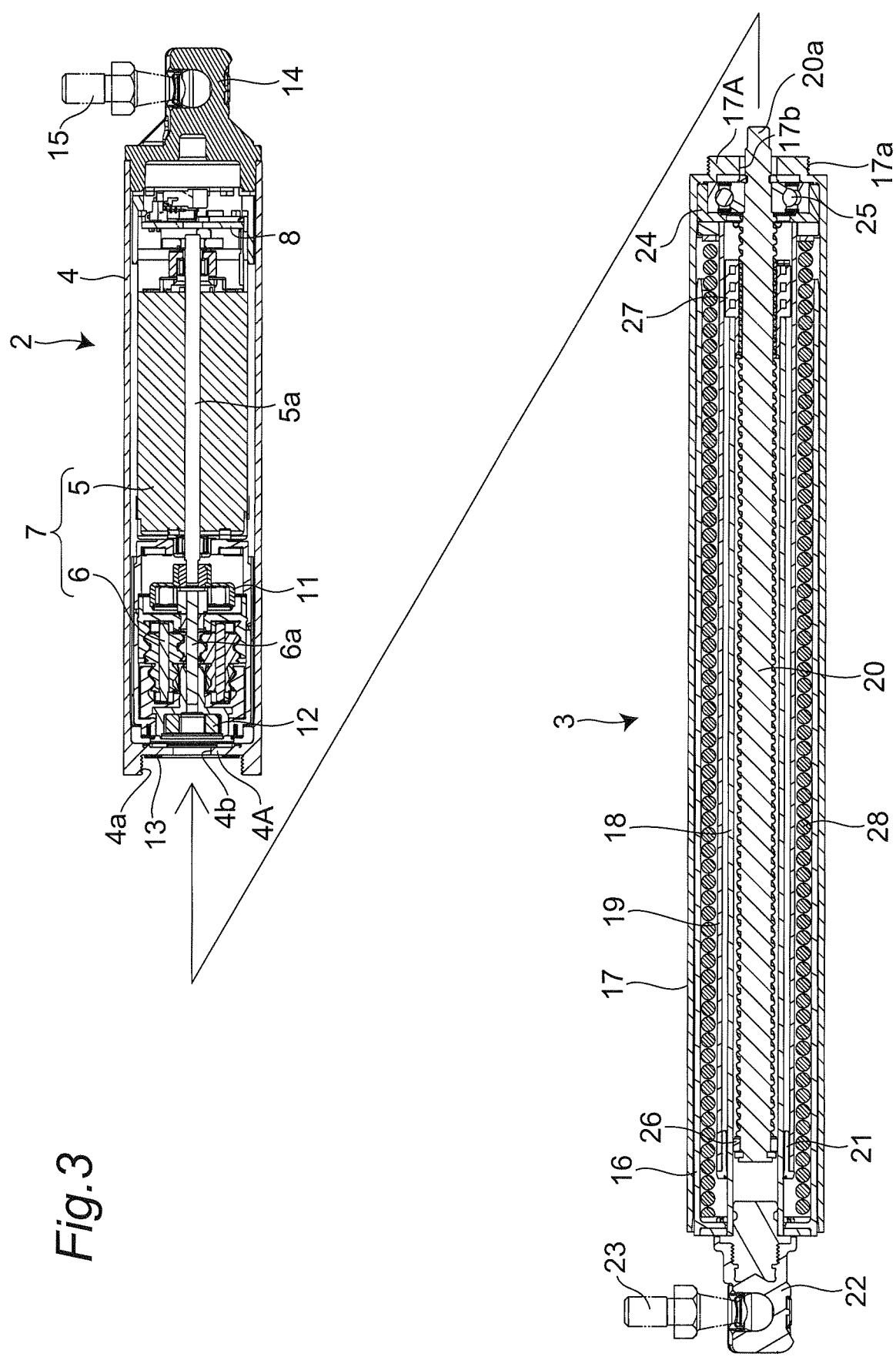
FIG. 3 is an exploded cross-sectional view of the support member provided to the door opening and closing apparatus for a vehicle according to the first embodiment of the present invention.
Figure 4:
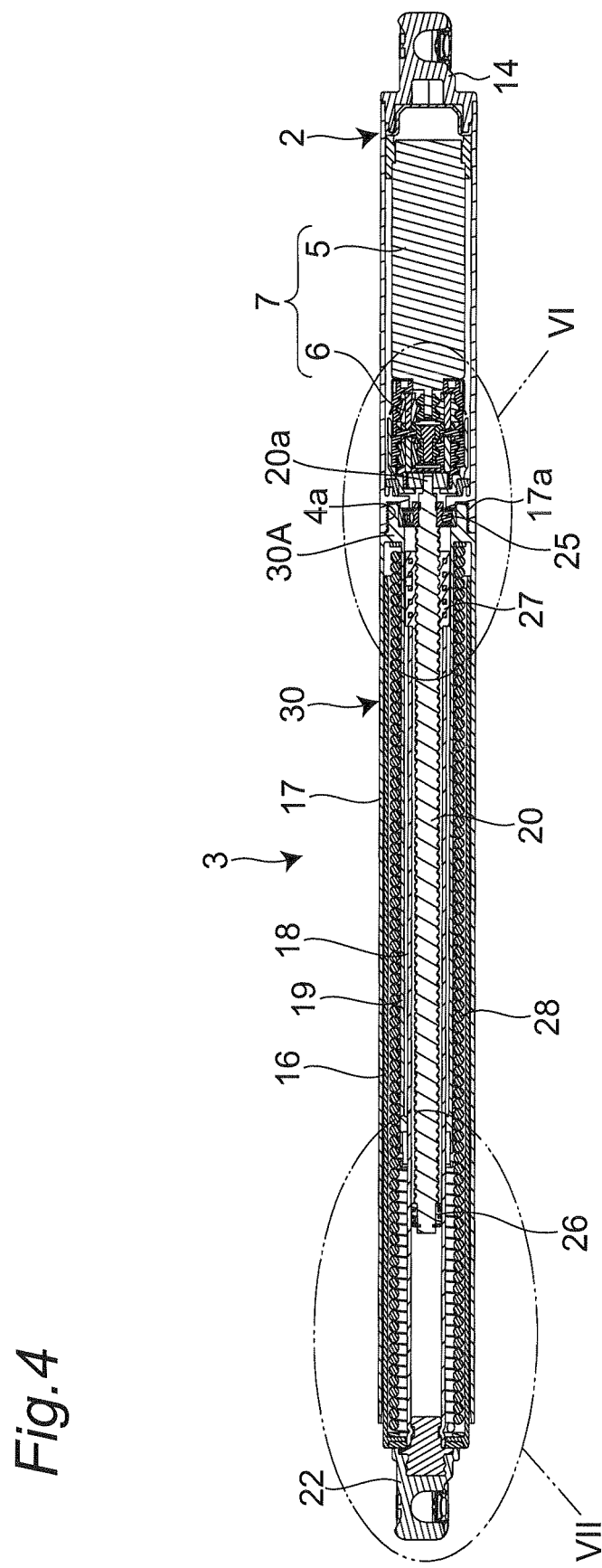
Figure 5:
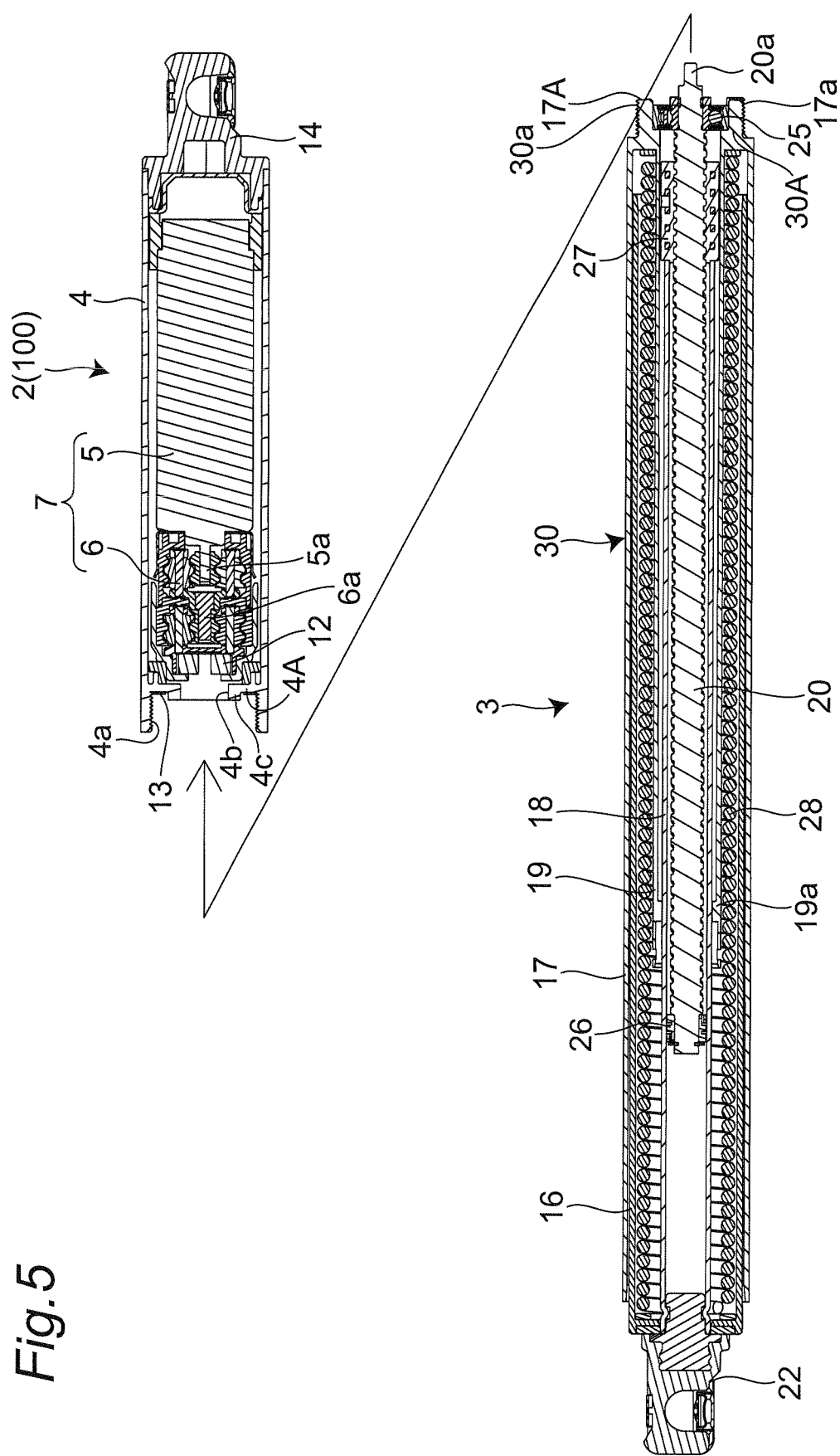

FIG. 1 is a front view of a support member provided to a door opening and closing apparatus 100 (for a vehicle) according to the present invention, FIG. 2 is a cross-sectional view taken along a line II-II in FIG. 1, and FIG. 3 is an exploded cross-sectional view of the support member.

The door opening and closing apparatus 100 (for a vehicle) according to the present invention includes: a support member 1 which is interposed between a body and a door (not shown in the drawing) of a vehicle and is expandable and shrinkable; and a controller 10. The door is closed due to expansion and shrinkage of the support member 1 and, at the same time, the support member 1 is maintained at an expanded state and hence, the door is held at an opening position. As shown in FIGS. 1 and 2, the support member 1 has an axially-divided two-split structure. That is, the support member 1 includes a first housing unit 2 and a second housing unit 3 which are integrally connected with each other.

As shown in FIGS. 2 and 3, the first housing unit 2 includes a circular cylindrical housing 4. In the inside of the housing 4, elements such as an electric motor driving mechanism 7, a printed circuit board 8 are housed. The electric motor driving mechanism 7 is formed of: an electric motor 5 which constitutes a drive source; and a speed reduction gear mechanism 6 which decelerates a rotation of the electric motor 5. On the printed circuit board 8, a Hall IC not shown in the drawing which counts the number of rotation of the electric motor 5 is mounted. The electric motor 5 and the Hall IC mounted on the printed circuit board 8 are electrically connected to a controller 10 through a plurality of codes 9 shown in FIG. 1. Electricity is supplied to the electric motor 5 and the Hall IC from the controller 10 through the codes 9 and, at the same time, a detection signal outputted from the Hall IC is transmitted to the controller 10.

The speed reduction gear mechanism 6 is formed of a planetary gear. An input shaft 6a of the speed reduction gear mechanism 6 is connected to one end of an output shaft (motor shaft) 5a of the electric motor 5 by a coupling 11. A first connection portion 12 is formed on an output portion (carrier) of the speed reduction gear mechanism 6. The first connection portion 12 is formed of an engaging hole having a rectangular cross section and a rectangular end portion of a spindle 20 described later is configured to be engageable with the first connection portion 12 by fitting engagement.

A female threaded portion 4a is formed on an inner periphery of one end portion (a left end portion in FIGS. 2 and 3) of the housing 4 in an axial direction, and a partition wall 4A is integrally formed with the housing 4 on a deep side (a right side in FIGS. 2 and 3) of the female threaded portion 4a. A circular hole 4b is formed at the center of the partition wall 4A, and a ring-shaped watertight member (watertight seal) 13 which prevents the entrance of moisture into the inside of the housing 4 of the first housing unit 2 is mounted on an outer surface of the partition wall 4A (a joining surface with the second housing unit 3).

The other end portion of the housing 4 in an axial direction (a right end portion of the housing 4 shown in FIGS. 2 and 3) is closed by a cap-shaped shaft end member 14. The shaft end member 14 is connected to a body of the vehicle not shown in the drawing by way of a ball joint 15.

The second housing unit 3 includes an outer cylinder 17, an inner cylinder 16, a push rod 18, a guide tube 19, the spindle 20, a spindle nut 27, and a coil spring (a compression spring) 28. The outer cylinder 17 has a circular cylindrical shape. The inner cylinder 16 has a circular cylindrical shape, is arranged in the outer cylinder 17 coaxially with the outer cylinder 17, and is fitted in the outer cylinder 17 in an axially movable manner. The guide tube 19 has a circular cylindrical shape, and is arranged in the inner cylinder 16 coaxially with the inner cylinder 16. The push rod 18 has a circular cylindrical shape, and is arranged in the guide tube 19. A spindle nut 27 is mounted on an end portion of the push rod 18 in an axial direction (a right end portion in FIGS. 2 and 3). The spindle nut 27 is fitted in the guide tube 19 in a state where the spindle nut 27 is movable by being guided in an axial direction on an inner periphery of the guide tube 19. The spindle 20 is arranged at a center portion in the inside of the push rod 18 in an axially extending manner in a state where the spindle 20 penetrates the spindle nut 27. The guide tube 19 is fitted on an outer periphery of the push rod 18 by way of a resin bush 21 mounted on an inner periphery of a distal end portion (a left end portion in FIGS. 2 and 3) of the guide tube 19. With such a configuration, the push rod 18 is arranged coaxially with the guide tube 19.

One end (a left end in FIGS. 2 and 3) of the outer cylinder 17 in the axial direction is opened. The inner cylinder 16 is inserted into and housed in the outer cylinder 17 from the opening portion in a state where the inner cylinder 16 is advanceable and retractable along an inner periphery of the outer cylinder 17. A stepped projection portion 17A is integrally formed with the other end (a right end in FIGS. 2 and 3) of the outer cylinder 17 in the axial direction. In other words, the other end of the outer cylinder 17 in the axial direction is not opened, and is closed by the stepped projection portion 17A. A male threaded portion 17*a* is formed on an outer periphery of the stepped projection portion 17A, and the male threaded portion 17*a* is threadedly engageable with a female threaded portion 4*a* formed on an inner periphery of one end of the housing 4 of the first housing unit 2 in an axial direction. A circular hole 17*b* through which the spindle 20 passes is formed in a center portion of the stepped projection portion 17A of the outer cylinder 17.

A shaft end member 22 is joined to an inner periphery of one end of the push rod 18 in an axial direction (a left end in FIGS. 2 and 3) by caulking, and the shaft end member 22 is connected to the door not shown in the drawing of the vehicle by way of the ball joint 23.

Threads are spirally formed on an outer periphery of the spindle 20, and a proximal end portion (a right end portion in FIGS. 2 and 3) of the spindle 20 is rotatably supported by a bearing 25. The proximal end portion of the spindle is integrally connected to the bearing 25 by means of a press fitted stop ring 29. In this embodiment, the bearing 25 is held by a bearing retainer 24 on an end portion in the outer cylinder 17 (an inner side of the stepped projection portion 17A). The bearing retainer 24 is fixed to the outer cylinder 17 by welding or the like. A distal end portion of the spindle 20 is rotatably supported by the push rod 18 by way of a resin bush 26 which is mounted on an outer periphery of the distal end portion of the spindle 20 by fitting engagement. A proximal end portion of the spindle 20 which passes through the circular hole 17*b* of the stepped projection portion 17A and projects toward the outside (a right end portion in FIG. 2) of the outer cylinder 17 forms a rectangular second connection portion 20*a* having an outer periphery thereof formed into a flat planar shape. The second connection portion 20*a* is engaged with the first connection portion 12 which is provided to the first housing unit 2 by fitting engagement such that the rotation is transmitted from the second connection portion 20*a* to the first connection portion 12 at the time of integrally joining the first housing unit 2 and the second housing unit 3 with each other as described later.

The spindle nut 27 which is housed in the inside of the guide tube 19 allows the insertion of the spindle 20 therethrough and is threadedly engaged with the spindle 20 in an axially movable manner. The spindle nut 27 is fixed to an end portion (a right end portion in FIGS. 2 and 3) of the push rod 18 in an axial direction. The spindle nut 27, the push rod 18, and the guide tube 19 form a spindle driving mechanism for moving the inner cylinder 16 in an axial direction relative to the outer cylinder 17 due to rotation of the spindle 20 as described later.

The coil spring 28 is arranged on an inner peripheral side of the inner cylinder 16 and on an outer peripheral side of the guide tube 19 in a radial direction and is arranged concentrically with the outer periphery of the guide tube 19. The guide tube 19 is arranged between the push rod 18 and the coil spring 28 in a radial direction and is also arranged concentrically with the push rod 18 and the coil spring 28. The coil spring 28 is arranged in a shrunken manner between one end portion of the inner cylinder 16 in which the shaft end member 22 is arranged and the other end portion of the outer cylinder 17 (more accurately, the bearing retainer 24) in an axial direction. Since one end portion of the coil spring 28 in an axial direction is brought into contact with one end portion of the inner cylinder 16 (a left side in FIGS. 2 and 3), the inner cylinder 16 is resiliently biased in a direction that the inner cylinder 16 extends toward the outer cylinder 17 (toward a left side in FIGS. 2 and 3). Accordingly, the inner cylinder 16 is brought into pressure contact with the shaft end member 22 due to a biasing force of the coil spring 28, and the inner cylinder 16 is connected with the push rod 18 in an axial direction due to such a pressure contact. Further, the other end portion of the coil spring 28 in an axial direction is supported by the bearing retainer 24.

By integrally connecting the first housing unit 2 having the above-mentioned configuration and the second housing unit 3 having the above-mentioned configuration to each other in an axial direction, the support member 1 shown in FIGS. 1 and 2 is assembled.

That is, FIG. 3 shows a state where the first housing unit 2 and the second housing unit 3 are separated from each other. From such a state shown in FIG. 3, the second connection portion 20*a* having a rectangular shape which is formed on one end of the spindle 20 in a axial direction and projects from the outer cylinder of the second housing unit 3 is engaged with the first connection portion 12 which is formed of a rectangular-shaped engaging hole of the first housing unit 2 by fitting engagement. Then, for example, by rotating the first housing unit 2 relative to the second housing unit 3, the male threaded portion 17*a* which is formed on the stepped projection portion 17A on one end of the outer cylinder 17 in an axial direction of the second housing unit 3 is made to threadedly engage with the female threaded portion 4*a* which is formed on the inner periphery of one end of the housing 4 in an axial direction of the first housing unit 2. With such an operation, the first connection portion 12 of the first housing unit 2 and the second connection portion 20a of the second housing unit 3 are connected to each other, and the spindle 20 of the second housing unit 3 and the electric motor driving mechanism 7 of the first housing unit 2 are connected to each other. Further, the first housing unit 2 and the second housing unit 3 are integrally joined to each other in an axial direction thus assembling the support member 1 shown in FIGS. 1 and 2.

As has been descried above, the watertight member 13 is interposed in a joint portion between the first housing unit 2 and the second housing unit 3 where the first housing unit 2 and the second housing unit 3 are integrally connected to each other. Due to a sealing effect of the watertight member 13, the joint portion between the first housing unit 2 and the second housing unit 3 can ensure a high water-tightness. Accordingly, it is possible to prevent the intrusion of water into the inside of the first housing unit 2 which is required to possess water-tightness from the joint portion. Since the second housing unit 3 is not required to possess water-tightness, by forming the housing into the split structure, it is possible to provide the structure where only a first housing unit 2 side has high water-tightness.

By connecting the spindle 20 of the second housing unit 3 and the electric motor driving mechanism 7 of the first housing unit 2 to each other, the rotation of the output shaft 5a of the electric motor 5 is transmitted to the spindle 20 in a state where the rotation is decelerated by the speed reduction gear mechanism 6.

With respect to the support member 1 which is formed by integrally connecting the first housing unit 2 and the second housing unit 3 to each other, one end of the support member 1 on a first housing unit 2 side in the axial direction is connected to the body on a fixed side of the vehicle by way of the shaft end member 14 and the ball joint 15, and the other end of the support member 1 on a second housing unit 3 side in the axial direction is connected to the door on a movable side of the vehicle by way of the shaft end member 22 and the ball joint 23.

Next, the manner of operation of the door opening and closing apparatus 100 for a vehicle provided with the support member 1 having the above-mentioned configuration is described.

In a state where the door of the vehicle is closed, the support member 1 is in a most compressed state shown in FIGS. 1 and 2, and the spindle nut 27 is positioned in the vicinity of the proximal end portion (a right end portion in FIG. 2) of the spindle 20. When a user performs an opening operation of the door by operating an operation switch mounted on the door from such a state, for example, the controller 10 (see FIG. 1) which detects such an operation starts the supply of electricity to the electric motor 5 of the first housing unit 2. With the supply of electricity, the electric motor 5 is started. The rotation of the output shaft 5a of the electric motor 5 is transmitted to the spindle 20 of the second housing unit 3 while being decelerated by the speed reduction gear mechanism 6 and hence, the spindle 20 is rotatably driven at a predetermined speed.

When the spindle 20 is rotatably driven as described above, the spindle nut 27 which allows the insertion of the spindle 20 therethrough and is threadedly engaged with the spindle 20 moves leftward in FIG. 2. The push rod 18 moves leftward in FIG. 2 together with the spindle nut 27, and the inner cylinder 16 moves in the same direction due to a biasing force of the coil spring 28 following the movement of the push rod 18. As a result, the inner cylinder 16 and the push rod 18 are pushed out from the inside of the fixed-side outer cylinder 17 so that the support member 1 extends. Accordingly, the door which is connected to one end of the support member 1 in an axial direction by way of the ball joint 23 connected to the shaft end member 22 which is jointed to the guide tube 18 is driven to an opening position. In such an operation, the door is driven to the opening position due to the biasing force of the coil spring 28 and a driving force of the electric motor 5 and hence, a weight load of the door is reduced by the biasing force of the coil spring 28 so that a load is minimally applied to the electric motor 5. Accordingly, downsizing of the electric motor driving mechanism 7 can be realized. In this embodiment, the leftward movement of the spindle nut 27 is restricted since the spindle nut 27 is brought into contact with the resin bush 26. In other words, the resin bush 26 of this embodiment also functions as a stopper for stopping the leftward movement of the spindle nut.

When the operation switch disposed inside the door is operated for driving the door at an open position to a closed position, for example, the controller 10 which detects an operation of the operation switch reversely drives the electric motor 5 so that the spindle 20 is rotated. Due to such a rotation of the spindle 20, the spindle nut 27 which allows the insertion of the spindle 20 therethrough and is threadedly engaged with the spindle 20 is moved in a reverse direction (a right side in FIG. 2) in the inside of the guide tube 19 together with the push rod 18. Accordingly, the inner cylinder 16 moves relative to the outer cylinder 17 against a biasing force of the coil spring 28 so that the inner cylinder 16 is retracted to the outer cylinder 17 and hence, the support member 1 is shrunken whereby the door is moved to the closed position.

As has been described heretofore, in this embodiment, the electric motor driving mechanism 7 (the electric motor 5 and the speed reduction gear mechanism 6) which is required to possess high water-tightness is provided to the first housing unit 2. On the other hand, the spindle 20, the coil spring 28, the spindle driving mechanism (the spindle nut 27, the push rod 18, the guide tube 19) and the like which are not required to possess high water-tightness are provided to the second housing unit 3. The support member 1 is formed by integrally connecting the first housing unit 2 and the second housing unit 3 to each other. Accordingly, the electric motor driving mechanism 7 which is required to receive an electrical inspection and the spindle 20 and the spindle driving mechanism (the spindle nut 27, the push rod 18, the guide tube 19) which is required to receive a mechanical inspection can be manufactured separately and hence, productivity and quality of the support member 1 can be enhanced.

Further, in the support member 1 according to this embodiment, the first housing unit 2 provided with the electric motor driving mechanism 7 can be used in common among different kinds of vehicles, and the second housing unit 3 provided with the spindle 20 and the spindle driving mechanism (the spindle nut 27, the push rod 18, the guide tube 19) can be set for respective vehicle types. Accordingly, it is also possible to acquire an advantageous effect that the support member 1 can be made to flexibly conform to different vehicle types without changing the whole configuration of the support member 1.

Second Embodiment

FIG. 4 to FIG. 8 are views showing a support member 1 according to a second embodiment of the present invention. In these drawings, elements identical with or similar to the corresponding elements in the first embodiment are given the same symbols. Further, in these drawings, the illustration of elements such as the ball joints 15, 23, the printed circuit board 8 is omitted. With respect to the second embodiment, the configurations and the manner of operations which are not particularly mentioned in the following description are substantially equal to the corresponding configurations and manner of operations of the first embodiment.

Figure 8:
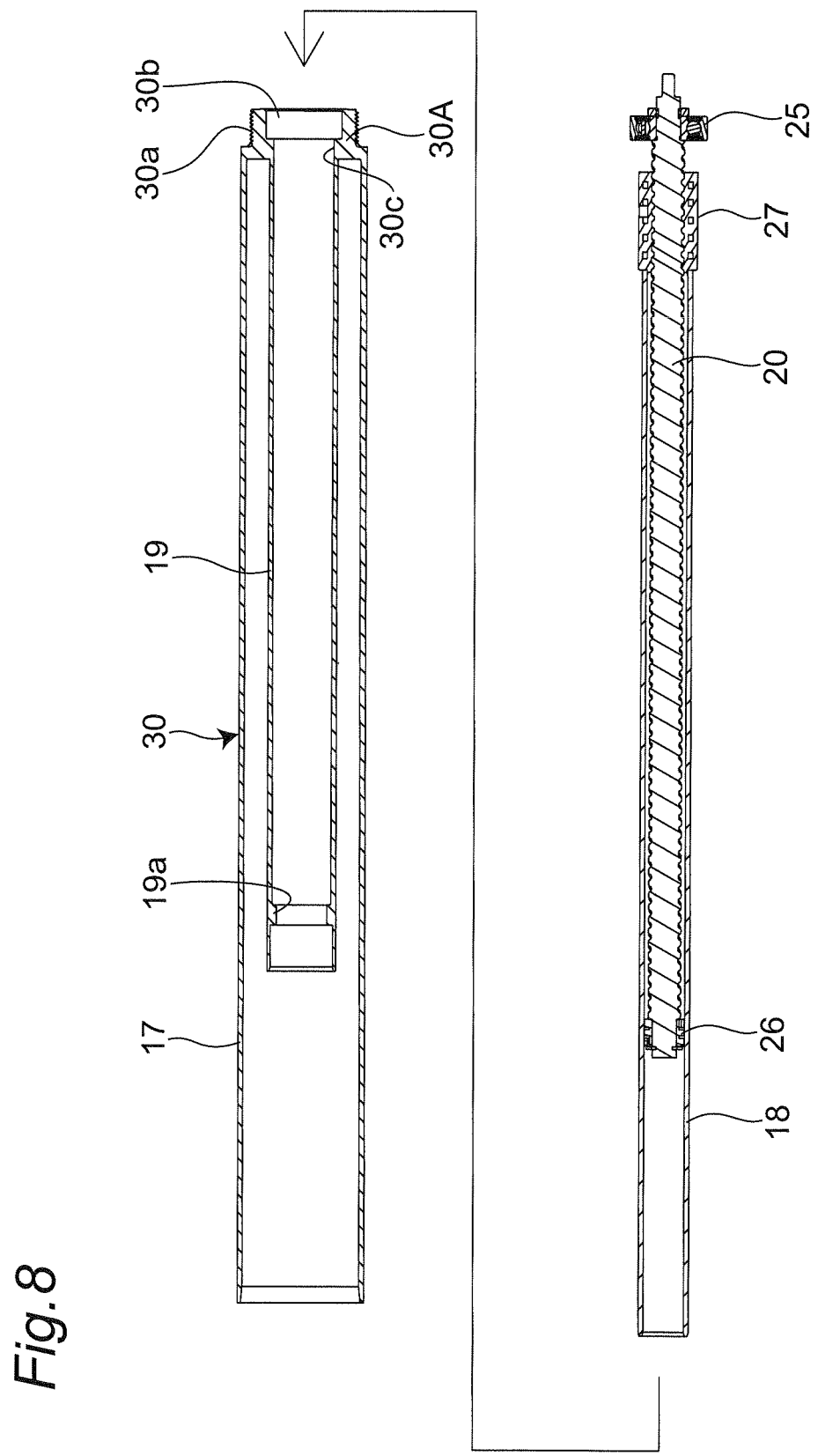
FIG. 8 is an exploded cross-sectional view of a guide housing tube and a push rod.

As most clearly shown in FIG. 8, a second housing unit 3 includes a guide housing tube 30 which is an integral body formed of an outer cylinder 17 and a guide tube 19. In this embodiment, the guide housing tube 30 is made of a resin.

A stepped projection portion 30A is formed on a proximal end portion (a right end portion in FIGS. 4, 5, 8) of the guide housing tube 30. The outer cylinder 17 and a proximal end portion of the guide tube 19 are integrally formed with the stepped projection portion 30A. A male threaded portion 30a is formed on an outer periphery of the stepped projection portion 30A and the male threaded portion 30a is threadedly engageable with a female threaded portion 4a formed on an inner periphery of one end of a housing 4 of the first housing unit 2 in an axial direction. In the drawing, a bearing housing portion 30b which is a relatively shallow circular recessed portion is formed on a right end surface of the stepped projection portion 30A. The stepped projection portion 30A closes a proximal end portion of the outer cylinder 17. In the stepped projection portion 30A, a circular hole 30c which makes the bearing housing portion 30b and the inside of the guide tube 19 communicate with each other is formed. A diameter of the circular hole 30c is equal to an inner diameter of the guide tube 19, and is smaller than a diameter of the bearing housing portion 30b.

Figure 6:
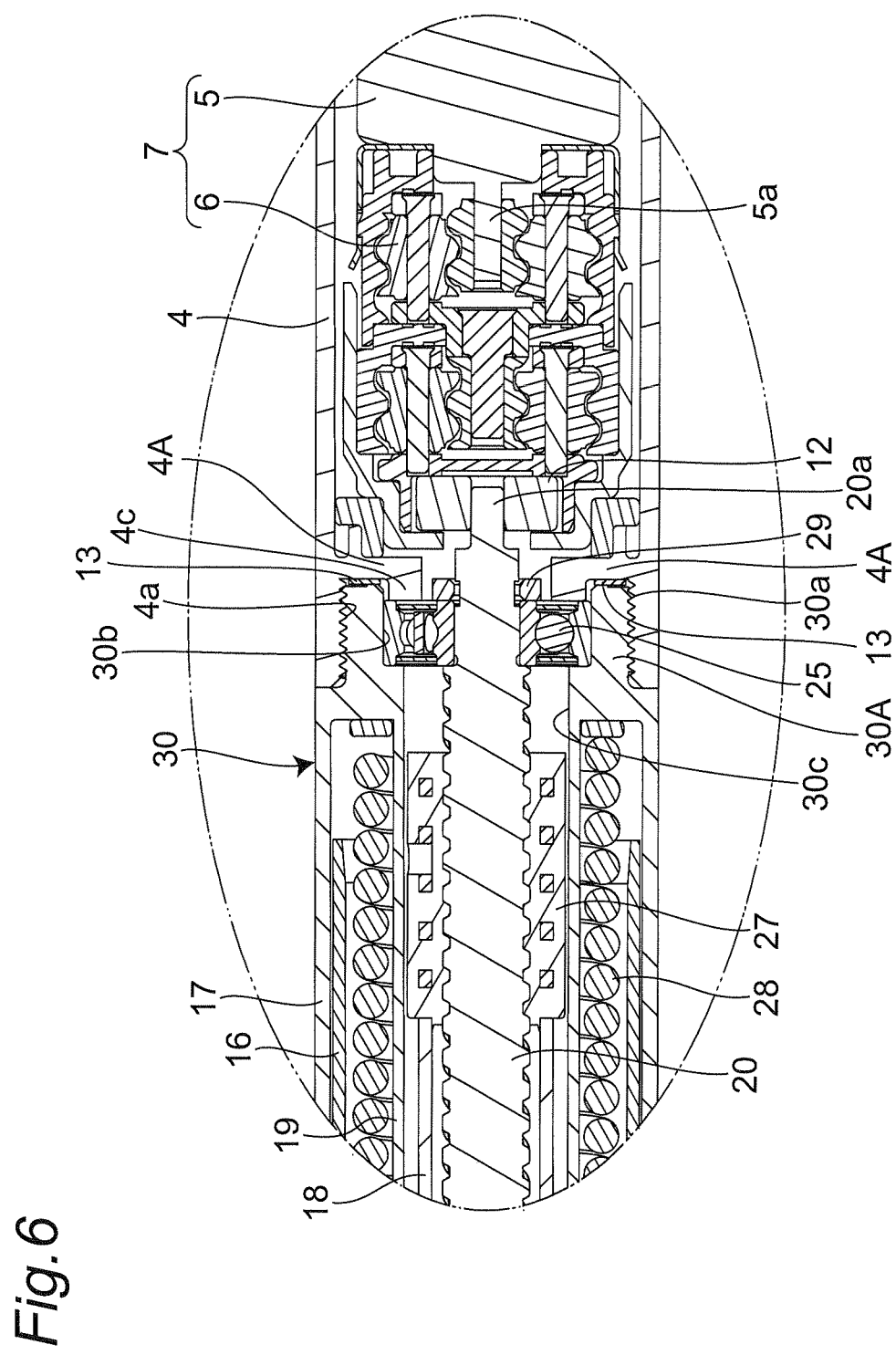
FIG. 6 is an enlarged view of a portion VI in FIG. 4.
Figure 7:
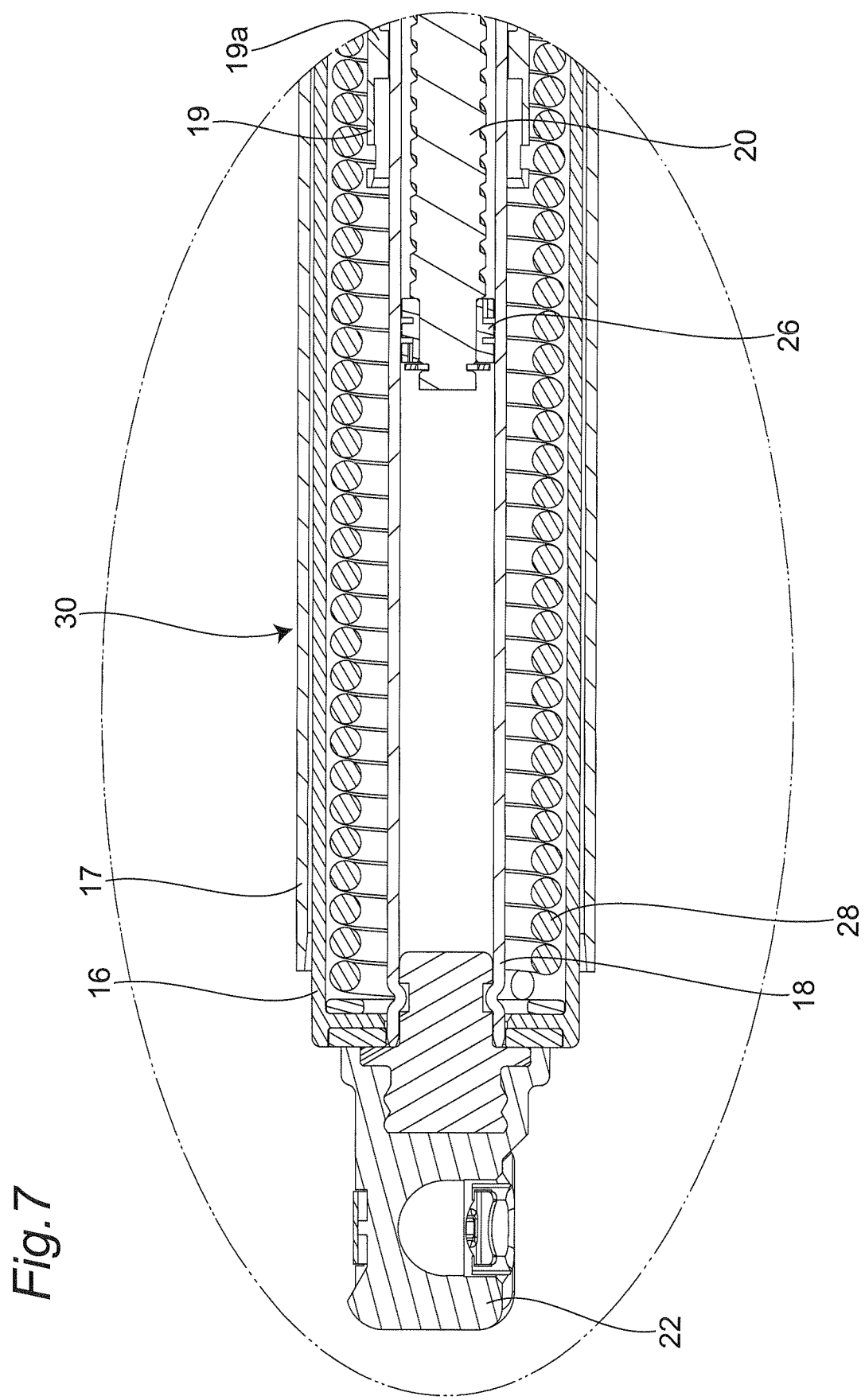
FIG. 7 is an enlarged view of a portion VII in FIG. 4.

With reference to FIG. 6, a bearing 25 is housed in the bearing housing portion 30b. The housing 4 of the first housing unit 2 includes a bearing holding portion 4c which is engaged with the bearing 25 housed in the bearing housing portion 30b in an axial direction. Also with reference to FIG. 5, in this embodiment, the bearing holding portion 4c projects outward from a partition wall 4A, and has a short circular cylindrical shape. The bearing 25 is held in the inside of the bearing housing portion 30b by being sandwiched between a bottom wall of the bearing housing portion 30b and a distal end of the bearing holding portion 4c. The proximal end portion of the spindle (a right side in FIGS. 2 and 3) is integrally connected to the bearing 25 by means of a press fitted stop ring 29 so as to be rotatable. A watertight member 13 for preventing intrusion of moisture into the housing 4 of the first housing unit 2 is interposed between a distal end of the stepped projection portion 30A and the partition wall 4A. With the provision of such a structure for holding the bearing 25, a bearing retainer becomes unnecessary (for example, see symbol 24 in FIGS. 2, 3). Since the bearing retainer can be eliminated, the number of parts can be reduced. Further, since fixing (welding) of the bearing retainer becomes unnecessary, an assembling operation can be simplified.

As conceptually shown in FIG. 8, an assembly where a push rod 18, a spindle nut 27, and the bearing 25 are assembled to the spindle 20 can be assembled to the guide housing tube 30 by being inserted into the guide tube 19 from the stepped projection portion 30A through the circular hole 30c. In other words, the assembling of the assembly including the spindle 20, the push rod 18, the spindle nut 27 and the bearing 25 to the guide housing tube 30 can be performed not from a distal end side but from a proximal end side. That is, the assembling of the assembly can be performed from a side where the second housing unit 3 and the first housing unit 2 are joined to each other. Accordingly, the assembling of these elements can be simplified.

As most clearly shown in FIG. 8, the guide tube 19 includes a circular annular guide portion 19a which projects inward from an inner wall surface of the guide tube 19 at a position relatively close to a distal end of the guide tube 19. Also with reference to FIG. 7, the push rod 18 is slidably fitted in the guide portion 19a. That is, the push rod 18 is guided in a slidable manner by the guide portion 19a of the guide tube 19. Further, the leftward movement of the spindle nut 27 is restricted by being brought into contact with the guide portion 19a. In other words, the guide portion 19a of this embodiment also functions as a stopper for stopping the leftward movement of the spindle nut 27. As described previously, in the first embodiment, the resin bush 26 functions as a stopper for stopping the movement of the spindle nut 27. On the other hand, in this embodiment, the guide portion 19a formed on the guide tube 19 functions as a stopper for stopping the movement of the spindle nut 27. Accordingly, a load which acts on a fixing (welding) portion between the spindle 20 and the bearing 25 in an axial direction can be reduced.

The guide tube 19 and the stepped projection portion 30A on which the bearing housing portion 30b is formed are not separate parts but form a unitary body. That is, the guide tube 19 and the stepped projection portion 30 form a part of the guide housing tube 30. Accordingly, the bearing 25 housed in the bearing housing portion 30b and the guide tube 19 can be accurately aligned with each other. Since the bearing 25 and the guide tube 19 can be accurately aligned with each other, the spindle 20 can be also accurately aligned with both the bearing 25 and the guide tube 19. As a result, it is possible to ensure the smooth rotation of the spindle 20. In other words, the positional displacement between the bearing 25 and the guide tube 19 can be eliminated and hence, the positional displacement of an axis of rotation of the spindle 20 can be prevented.

In the above-mentioned embodiments, the door opening and closing apparatus for a vehicle is configured such that the end portion of the support member 1 on a first housing unit 2 side is connected to the body of the vehicle, and the end portion of the support member 1 on a second housing unit 3 side is connected to the door of the vehicle. On the other hand, the door opening and closing apparatus for a vehicle may be configured such that the end portion of the support member 1 on a first housing unit 2 side is connected to the door of the vehicle, and the end portion of the support member 1 on a second housing unit 3 side is connected to the body of the vehicle. Further, in the above-mentioned embodiments, the support member 1 is configured by integrally connecting the first housing unit 2 and the second housing unit 3 to each other by threaded engagement. However, the first housing unit 2 and the second housing unit 3 may be integrally joined to each other by other methods such as laser welding.

What is claimed is:

1. A door opening and closing apparatus for a vehicle, the door opening and closing apparatus comprising:
   a support member which is configured to be interposed between a body of the vehicle and a door of the vehicle and which is expandable and retractable,
   wherein the support member comprises:
   a first housing unit with an electrical motor driving mechanism; and a second housing unit having a proximal end which is connected to a distal end of the first housing unit so that the second housing unit is integrated with the first housing unit, wherein the second housing unit comprises:

an outer cylinder;

an inner cylinder coaxially arranged in the outer cylinder and moveably engaged with the outer cylinder;

a spindle connected to the electrical motor driving mechanism; and a spindle driving mechanism configured to move the inner cylinder with respect to the outer cylinder in an axial direction by rotating the spindle, wherein the spindle has a proximal end portion which is located out of the proximal end of the second housing unit, extends into the first housing unit, and is connected to the electrical motor driving mechanism, wherein the electrical motor driving mechanism includes an electric motor and a speed reduction gear mechanism for decelerating a rotation of the electric motor, wherein the first housing unit includes a housing accommodating the electric motor and the speed reduction gear mechanism, wherein the second housing unit comprises:

a push rod fixed to a spindle nut screwed with the spindle;

a guide tube accommodating the push rod and the spindle nut and being configured to guide the push rod with the spindle nut so that the push rod can be moved in the axial direction, the guide tube having a proximal end arranged in the outer cylinder without extending out of the outer cylinder; and a shrunk coil spring arranged outside the push rod coaxially with the push rod, wherein the inner cylinder is connected to the push rod in the axial direction, coaxially arranged outside the guide tube, and configured to be urged by the shrunk coil spring in the axial direction at an inner peripheral end face, wherein the outer cylinder accommodates the inner cylinder so that the inner cylinder is forwardly and backwardly movable, wherein the housing of the first housing unit has a partition wall at a distal end, the partition wall being defined with a hole so as to penetrate the partition wall in a thickness direction, wherein the speed reduction gear mechanism includes an output portion defined with an engaging hole and arranged adjacent to the partition wall such that the hole of the partition wall and the engaging hole are aligned with each other, and wherein the proximal end portion of the spindle is inserted into the hole of the partition wall and engaged with the engaging hole.

2. The door opening and closing apparatus according to claim 1, wherein the second housing unit includes a male threaded portion, and wherein the first housing unit includes a female threaded portion configured to be mated with the male threaded portion.

3. The door opening and closing apparatus according to claim 1, further comprising a watertight member arranged on the partition wall so as to be interposed between the first housing unit and the second housing unit.

4. The door opening and closing apparatus according to claim 1, wherein the outer cylinder and the guide tube are integrated so as to define a guide housing tube.

5. The door opening and closing apparatus according to claim 4, wherein the guide housing tube of the second housing unit includes a stepped projection portion including a male threaded portion at a proximal end, wherein the housing of the first housing unit includes a female threaded portion at the distal end, and wherein the stepped projection portion includes a bearing housing portion in which a bearing for supporting the spindle is accommodated.

6. The door opening and closing apparatus according to claim 5, wherein the housing of the first housing unit includes a bearing holding portion configured to be engaged with the bearing accommodated in the bearing housing portion in the axial direction.

7. The door opening and closing apparatus according to claim 1, wherein the first housing unit includes a male threaded portion, and wherein the second housing unit includes a female threaded portion configured to be mated with the male threaded portion.

8. The door opening and closing apparatus according to claim 7, wherein the outer cylinder and the guide tube are integrated so as to define a guide housing tube.

* * * * *